(12) United States Patent
Beckstrom et al.

(10) Patent No.: US 7,773,740 B2
(45) Date of Patent: Aug. 10, 2010

(54) AGENT REGISTRATION AND BIDDING SYSTEM

(75) Inventors: Robert Beckstrom, Bolingbrook, IL (US); Anthony Dezonno, Bloomingdale, IL (US); Michael J Sheridan, Goodyear, AZ (US); David Wesen, Channahon, IL (US)

(73) Assignee: Aspect Software, Inc., Lombard, IL (US)

( * ) Notice: Subject to any disclaimer, the term of this patent is extended or adjusted under 35 U.S.C. 154(b) by 980 days.

(21) Appl. No.: 10/616,016

(22) Filed: Jul. 9, 2003

(65) Prior Publication Data

US 2005/0008139 A1    Jan. 13, 2005

(51) Int. Cl.
*H04M 3/00* (2006.01)
*H04M 5/00* (2006.01)
*H04L 12/66* (2006.01)

(52) U.S. Cl. .......................... 379/265.13; 379/265.01; 379/265.02; 379/265.08; 379/265.11; 370/352

(58) Field of Classification Search ............ 379/265.13, 379/114.15, 265.11, 265.01, 265.02, 265.05, 379/265.08, 266.01; 705/7; 718/104; 709/226; 707/100; 370/352
See application file for complete search history.

(56) References Cited

U.S. PATENT DOCUMENTS

| | | | |
|---|---|---|---|
| 5,555,179 A | | 9/1996 | Koyama et al. |
| 5,675,636 A | * | 10/1997 | Gray ..................... 379/114.15 |
| 5,731,276 A | | 3/1998 | Argo et al. |
| 5,765,033 A | | 6/1998 | Miloslavsky |
| 5,926,539 A | | 7/1999 | Shtivelman |
| 5,946,387 A | | 8/1999 | Miloslavsky |
| 5,953,332 A | | 9/1999 | Miloslavsky |

(Continued)

*Primary Examiner*—Thjuan K Addy
(74) *Attorney, Agent, or Firm*—Husch Blackwell Sanders Welsh Katz

(57) ABSTRACT

A method and apparatus are provided for assigning a call to one of a plurality of agents. The method includes the steps of providing a description of the call to each of the plurality of agents, receiving a bid to handle the call from each of the plurality of agents and assigning the call to an agent of the plurality of agents with a highest relative received bid.

23 Claims, 1 Drawing Sheet

U.S. PATENT DOCUMENTS

| | | |
|---|---|---|
| 5,953,405 A | 9/1999 | Miloslavsky |
| 6,002,760 A | 12/1999 | Gisby |
| 6,021,428 A | 2/2000 | Miloslavsky |
| 6,044,145 A | 3/2000 | Kelly et al. |
| 6,044,368 A | 3/2000 | Powers |
| 6,067,357 A | 5/2000 | Kishinsky et al. |
| 6,108,711 A | 8/2000 | Beck et al. |
| 6,138,139 A | 10/2000 | Beck et al. |
| 6,167,395 A | 12/2000 | Beck et al. |
| 6,170,011 B1 | 1/2001 | Beck et al. |
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,345,305 B1 | 2/2002 | Beck et al. |
| 6,366,575 B1 * | 4/2002 | Barkan et al. ............... 370/352 |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,732,156 B2 | 5/2004 | Miloslavsky |
| 7,023,979 B1 * | 4/2006 | Wu et al. ............... 379/265.11 |
| 7,269,253 B1 * | 9/2007 | Wu et al. ............... 379/265.11 |
| 2001/0042123 A1 * | 11/2001 | Moody et al. ............... 709/226 |
| 2003/0171234 A1 | 9/2003 | Ajmani et al. |
| 2004/0088206 A1 * | 5/2004 | Thompson et al. ............. 705/7 |
| 2004/0088300 A1 * | 5/2004 | Avery et al. ................. 707/100 |
| 2005/0005272 A1 * | 1/2005 | Moody et al. ............... 718/104 |

* cited by examiner

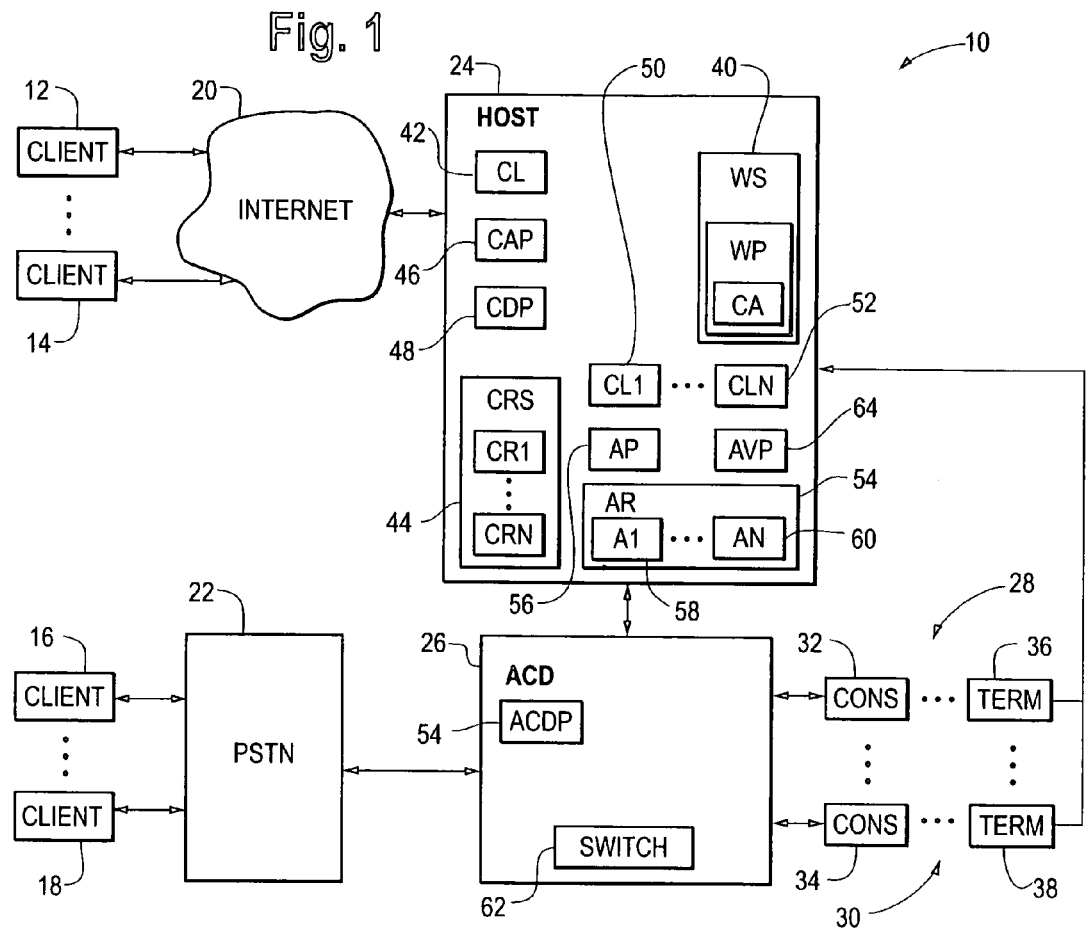

AGENT REGISTRATION AND BIDDING SYSTEM

FIELD OF THE INVENTION

The field of the invention relates to communication systems and more particularly to contact centers.

BACKGROUND OF THE INVENTION

Contact centers in their various forms are generally known. Contact centers are generally used by organizations to receive calls directed to the organization and to automatically deliver the calls to agents of the organization based upon some algorithm.

One form of a contact center is a call center. A call center functions to receive calls through the public switched telephone network (PSTN). Calls received through the PSTN may be received with such information as DNIS and ANI information. From the DNIS and ANI information, a controller of the call center may determine an intended destination of the call and an identity of the caller. From the intended destination of the call and identifier of the caller, the call center may select an agent that has the best qualifications to handle the call.

Contact centers differ from call centers in being able to handle calls through additional communication mediums (e.g., the Internet). However, contact centers function in a similar manner in being able to identify call targets and callers and in their ability to select agents accordingly.

While the methods used by contact centers is effective in connecting agents with callers, they do not always select the best agent to handle the call. Agent selection is typically based upon an arbitrary set of skills attributed to agents by an operator of the call center. Agent selection based upon the arbitrary set of skills often result in agent selections that do not always meet the caller's or agent's needs. Accordingly, a need exists for a better method of assigning agents to calls that is less dependent upon the arbitrary skills attributed to agents by an operator of the call center.

SUMMARY

A method and apparatus are provided for assigning a call to one of a plurality of agents. The method includes the steps of providing a description of the call to each of the plurality of agents, receiving a bid to handle the call from each of the plurality of agents and assigning the call to an agent of the plurality of agents with a highest relative received bid.

BRIEF DESCRIPTION OF THE DRAWINGS

FIG. 1 depicts a contact center in a communication system under an illustrated embodiment of the invention; and FIG. 2 depicts a call selection window that may be used with the system of FIG. 1.

DETAILED DESCRIPTION OF AN ILLUSTRATED EMBODIMENT

FIG. 1 is a block diagram of a contact center 10 and communication system shown generally in accordance with an illustrated embodiment of the invention. The call center 10 may be used by any number of different types of organizations (e.g., commercial, political, environmental, etc.) to distribute calls to its agents. To this end, the organization may promulgate, by advertising or otherwise, a contact identifier for contacting the organization. The contact identifier may be a telephone number for calls through the PSTN 22, an e-mail address or a universal resource locator (URL) of a website 40 operated by the organization.

Alternatively, the organization may maintain a client list 42 of past or potential customers. Within the client list 42 may be one or more contact identifiers that may be used to contact clients 12, 14, 16, 18.

Contacts with clients 12, 14, 16, 18 may be handled by one or more agents of the organization that may have been specially trained to handle calls with clients 12, 14, 16, 18. To this end, each agent may be provided with an agent station 28, 30 through which the agent may handle calls with clients 12, 14, 16, 18. (Hereinafter, the agent and agent station may be referred to synonymously using reference numbers 28, 30.)

Each agent station 28, 30 may be provided with a telephone console 32, 34 and a computer terminal 36, 38. The console 32, 34 may be used by the agent 28, 30 for engaging in voice conversations with clients 12, 14, 16, 18. The terminal 36, 38 may be used to retrieve customer records and make order entries in customer records 44.

While the telephone consoles 32, 34 are shown as being connected to an automatic call distributor (ACD) 26 for handling voice calls, it should be understood that the consoles 32, 34 or terminals 36, 38 may also be available for voice calls using Internet telephony. In the case of Internet Telephony, the consoles 32, 34 or terminals 36, 38 may establish contact and exchange voice information between agents 28, 30 and clients 12, 14 through the Internet 20 using Voice over Internet Protocol (VoIP).

The terminals 36, 38 may also be used by agents for conversing with clients 12, 14 by exchanging text through the Internet. The exchange may occur under Instant Messaging or by e-mail.

The contact center 10 may operate by receiving incoming and also by placing outgoing calls. In general, the volume of outgoing calls may be adjusted to a level necessary to keep all of the agents occupied at some predetermined level of productivity.

The contact center 10 may receive calls from (or place calls to) clients 12, 14, 16, 18 through the Internet 20 or PSTN 22 and distribute the calls to agents based upon a call selection process that is at least partly controlled by the agents 28, 30. In order to allow agent selection of calls, a call display processor 48 within the host 24 collects and displays information about received, but unanswered, calls to available agents on a terminal of the agent. As used herein, an unanswered call is a call that has never been answered during a current call attempt or a call that has been transferred among agent groups, but has not yet been answered.

As each call arrives, the call display processor 48 creates a new call record (CL) 50, 52 for the call. Call associated information may be stored in the created call record 50, 52. As used herein, call associated information is information that identifies either a source or a destination of the call and is delivered by the call delivery mechanism rather than by the call itself.

For example, calls delivered through the PSTN would be delivered with DNIS and ANI information. Since DNIS and ANI would be provided by mechanisms from within the PSTN 22, it would be regarded as call associated information.

Within the ACD 26, an ACD processor (ACDP) 54 would receive the call along with the call associated information. The call associated information would be transferred to the call display processor 48. The call display processor 48, in turn, would open a call record for the call including at least the DNIS and ANI information.

Calls may also arrive through the website 40. As used herein, a call delivered through the website means a website visitor who activates a "CONTACT AGENT" or "SPEAK WITH AGENT" softkey displayed on a page of the website 40.

In the case of calls arriving through the web site 40, the header and source field of any arriving packets would be examined to determine a URL of the destination of the packet and the URL of the source 12, 14 of the packet. As above, the URLs of the source and destination of the packet would be call associated information. Also, as above, the call display processor 48 would open a call record 50, 52 each time a new packet arrives and save at least the call associated information within the file 50, 52. In the case where the "CONTACT AGENT" or "SPEAK WITH AGENT" softkey is associated with an interactive window, any information entered through the window may also be saved in the file 50, 52.

Similarly, e-mails may be analyzed to recover source and destination information for entry into a new file 50, 52 as call associated information. Any text associated with the e-mail may also be stored in the file 50, 52.

In addition to opening a call file 50, 52 for each call, the call display processor 48 may also classify each call type and add the classification to the call record 50, 52. Classification may be based upon any criteria, such as the identity of a call target. In the case where the organization that uses the contact center 10 is a department store, one call target may be hardware, another may be ladies shoes, etc. Other classifications may be based upon calls from a particular call source or even the type of call (e.g., telephone, chat, e-mail, etc.).

In addition to classifying calls, the call display processor 48 may also retrieve a minimum skill requirement for each call. The minimum skill requirement may relate to the call classification, the call destination, the caller or even the geographic origins of the call.

Once a call file 50, 52 is opened, the call display processor 48 may begin looking for an agent 28, 30 to handle the call. To identify an agent 28, 30 to handle the call, the call display processor 48 may first identify available agents 28, 30 and then strive to offer the call for selection by an agent 28, 30.

To offer a call to an agent 28, 30, the call display processor 48 may compose and download a call selection window 100 (FIG. 2) to a terminal 36, 38 of each available agent 28, 30. As may be seen from FIG. 2, the call selection window 100 may include a separate presentation window 102, 104 for each unanswered call.

Within each presentation window 102, 104 may be call target identifier 106, 114, a client identifier 108, 116, a context descriptor 110, 118 and a BID ENTRY window/button 112, 120. The call target identifier may be used to identify an intended target of the call. Any indicia of the intended target may be displayed within the window 106, 112 as the call target identifier (e.g., telephone number, URL, keywords, etc.). For example, in the case where the organization using the contact center 10 is a department store, one target identifier 106 may be labeled "HARDWARE" while another target identifier 114 may be "LADIES SHOES".

The client identifier window 108, 116 may identify a source of the call for the benefit of any bidding agents 28, 30. To identify a source of the call, the call display processor 48 may search a list of client records 44 using any source information (e.g., ANI, source URL, etc.) within the call associated information. In the case where the source information of a call can be matched with an existing client, an identifier of the client may be displayed in the client identifier window 108, 116. Where a match cannot be found between the source identifier and any customer record, then the word "UNKNOWN" may be displayed in the window 108, 116.

The context descriptor window 110, 118 may be used to provide contextual information about the call or client. In the case of an e-mail, a title of the e-mail may be displayed as an indication of the context of the call. If the call originates by activation of the "CONTACT AGENT" or "SPEAK WITH AGENT" button on a webpage, then a descriptor of the webpage may be displayed in the box 110, 118 as an indication of the context from which the call originated.

If the call is received through the PSTN 22, then client records 44 may be searched to provide an indication of the context of prior calls. From the client records 44, a descriptor of the client's business, or last order may be displayed in the context descriptor window 110, 118.

The ENTER BID window/button 112, 120 may be a combination of an interactive window and softkey button. To use the ENTER BID window/button 112, 120, the agent 28, 30 may double click on the window/button (using the window in a manner similar to a softkey) or may click on the window/button, enter a single alphanumeric digit (as a bid value) and activate the ENTER button. As used herein, a bid is an alphanumeric offer by an agent to handle a call where the alphanumeric character of the offer is a subjective measure of the agent's desire to handle the call upon which the bid is placed.

As calls arrive, the call display processor 48 retrieves the list of available agents from a set of agent files 54 and transfers a call selection window 100 to each available agent 28, 30. Each time a new call arrives, the call display processor 48 may update the call selection window 100 to include the new call as well as to delete any calls that have already been assigned to agents 28, 30.

Using the call selection window 100, agents 28, 30 may bid on calls. An agent 28, 30 may enter a general bid on a call by either double clicking on an ENTER BID window/button 112, 120 or by entering a specific bid value into the window/button 112, 120 and pressing ENTER.

If one or more available agents 28, 30 bid on a call, then a call assignment processor 46 may assign that call to the highest bidder, subject to certain minimum requirements based upon factors such as skill. If a call is not selected by any agent within a predetermined time period, then an agent may be assigned to the call using conventional techniques.

Bidding may be limited to a predetermined bidding time period (e.g., 5 seconds, 10 seconds, etc.) to allow for the prompt servicing of calls. A timer within the call display processor may be started as each call is download for display on the agent terminals 36, 38. When the predetermined bidding time expires, the call display processor may send a time-out message to the call assignment processor 46.

As an agent 28, 30 enters a bid, the terminal 32, 34 of the agent 28, 30 may forward the bid to an agent processor 56. The agent processor 56 may retrieve a skill rating of each bidding agent 28, 30 from agent files 58, 60 and compare the skill rating of the agent 28, 30 with a minimum, threshold skill requirement for the call. Bids from an agent 28, 30 with a skill rating that does not exceed the minimum level of skill required for a call may be deleted. Bids from agents 28, 30 that meet or exceed the minimum skill requirement may be forwarded to the call assignment processor 46.

Bids from agents may be based upon virtually any criteria. Under one criteria, bids may be based upon an alphanumeric character entered through the ENTER BID window/button 112, 120. For example, one bidding system may be from 1 to 10, with 10 being the highest bid and indicating the greatest desire by an agent 28, 30 to handle the call.

In effect, the call assignment processor 46 may receive and prioritize bids based upon desire by an agent to handle a particular call. At the end of the bidding period for the call, the agent 28, 30 submitting the highest bid may be selected for the call.

As agents 28, 30 sign-in for each shift through their terminals 36, 38, the agent processor 56 receives the sign-in information and saves it into the available agent list 54. As each agent 28, 30 is assigned a call, the call assignment processor 46 may set a flag that removes the agent 28, 30 from the available file 54. As the agent 28, 30 completes each call, the agent 28, 30 is returned to the available agent file 54.

For example, if the call is received through the PSTN 22, then the call assignment processor 46 may send instructions to the ACD processor 54 to connect the call to the agent console 32, 34 of the selected agent 28, 30 through a matrix switch 62. Once the call connection is made, the ACD processor 54 may monitor the call connection. When the ACD processor 54 detects that the agent has hung up, the ACD processor 54 may send a message to the call assignment processor 46 that the agent has hung up and the agent should be returned to the list of available agents.

The case of e-mails and chat sessions between agents 28, 30 and clients 12, 15 may be handled in a similar manner. When the call is assigned to an agent 28, 30, the call assignment processor 46 removes the assigned agent from the available agent list. When the call is complete, as determined either by the passage of a predetermined time period without any further messages or by the agent pressing a release key, the agent is returned to the list of available agents.

Once an agent 28, 30 is returned to the available agents list, a timer may be started for each agent 28, 30. In the event that an acceptable bid is not received on a call by the call assignment processor 46 within the bidding time, then the call assignment processor 46 may seek out and assign the call to the agent with the longest time since the last call assignment, as a default agent.

It should be noted in this regard, that in some cases, the agent assigned to a call as a default agent may already have bid on one or more other calls. However, if the agent is selected as a default agent and assigned to a call before being assigned to any other call, then the identifier of the selected agent is removed from the bidding list of the other calls.

It has been noted above, that an agent 28, 30 may simply double click on the ENTER BID window/button 112, 120. The act of double clicking on a button 112, 120 may be understood as providing the lowest possible bid on the call.

By selecting calls, through use of the ENTER BID window/button 112, 120, a agent 28, 30 has the ability to select calls that the agent 28, 30 is most qualified to answer, that the agent 28, 30 is best at handling or that the agent 28, 30 derives the most money from. It also relieves the tedium of working by allowing the agent 28, 30 the opportunity of selecting calls that the agent 28, 30 believes would be interesting or challenging to the agent 28, 30.

In another embodiment of the invention, an averaging processor 64 may calculate the average number of calls per time period handled by each agent 28, 30 for each call classification. The averaging processor 64 may also calculate an average number of calls for each call classification handled by the group of agents 28, 30 as a whole.

A set of threshold values within the averaging processor 64 may be used to disqualify agents who attempt to preferentially select the easiest (or most profitable) call type. The threshold values may be absolute or may be an incremental value that is added to the average value of the group of agents 28, 30 for that classification. In this case, if the number of calls served by an agent 28, 30 during any time period for a particular call type exceeds the threshold value, then the call assignment processor 46 may reject any bids from the agent 28, 30 for the remainder of the time period.

A specific embodiment of an agent registration and bidding method and system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of assigning a plurality of pending calls within a contact center to a plurality of agents at least some of which are human agents, such method comprising the steps of:
   providing an offer for each of the plurality of pending calls to at least some of the human agents who are available to handle calls prior to assignment of the pending calls to an agent, said offers being presented on a respective terminal of each of the at least some agents where the offer and a description of each of the plurality of pending calls is presented within a separate window on the terminal and allowing the available human agents to separately bid on handling each of the pending calls and where each of the plurality of pending calls is classified as to media type, the description of each of the plurality of pending calls including call associated information, and non-call associated contextual information of the pending call;
   determining an agent average number of calls handled per time period for each media type for each agent of the plurality of agents;
   receiving bids within the contact center to handle the pending calls from the at least some of the available human agents; and
   the contact center assigning at least some of the pending calls to a human agent of the plurality of agents with a highest relative received bid.

2. The method of assigning calls as in claim 1 wherein the description of the call comprises a call target identifier and a client identifier.

3. The method of assigning calls as in claim 2 further comprising submitting a lowest possible bid from an agent of the plurality of agents in response to the agent double-clicking on an Enter Bid button or window.

4. The method of assigning calls as in claim 1 wherein the step of providing the description further comprises displaying the provided information on a terminal display of each available agent of the plurality of agents in a separate call selection window for each call.

5. The method of assigning calls as in claim 1 further comprising defining the bid as being a numerical value between two non-zero limits.

6. The method of assigning calls as in claim 1 wherein the received bids are one of a general and a specific bid.

7. The method of assigning calls as in claim 1 further comprising calculating a group average of calls handled per time period of the call type of the classified call.

8. The method of assigning calls as in claim 7 further comprising rejecting any bid from an agent of the plurality of agents where the agent's determined agent average exceeds a threshold value above the calculated group average.

9. The method of assigning calls as in claim 1 further comprising assigning a call of the plurality of calls to a default agent of the plurality of agents when an acceptable bid is not received within a predetermined time period.

10. A apparatus used within a contact center for assigning a plurality of pending calls to a plurality of agents at least some of which are human agents, such apparatus comprising:

means for displaying an offer including a description for each of the calls to at least one of the human agents of the plurality of agents who is available for conversing with callers prior to assignment of the calls to an agent, said means for displaying containing a separate window for each of the plurality of offers, thereby offering the calls to the at least one available human agent for bidding, the description including context information providing textual content of the call or a descriptor indicating a context from which the call originated;

means for classifying each call as to a call type and for determining an agent average number of calls handled per time period for each call type for each agent of the plurality of agents;

means within the contact center for receiving a bid to handle a call of the plurality of calls from at least one of the human agents; and means within the contact center for assigning the call to an agent of the at least one of the available human agents with a highest relative received bid.

11. The apparatus for assigning calls as in claim 10 wherein the means for displaying further comprises means for submitting a lowest possible bid in response to one of the human agents double-clicking on a Enter Bid button or window.

12. The apparatus for assigning calls as in claim 11 further comprising means for rejecting any bid from an agent of the plurality of agents who does not meet a minimum skill level for the call.

13. The apparatus for assigning calls as in claim 10 wherein the means for providing the description further comprises means for displaying the provided information on a terminal display of each agent of the plurality of agents.

14. The apparatus for assigning calls as in claim 10 further comprising means for defining the bid as being a numerical value between two limits.

15. The apparatus for assigning calls as in claim 14 wherein the means for defining the bid as being a numerical value between two limits further comprises means for defining the two limits as being a numerical value between one and ten.

16. The apparatus for assigning calls as in claim 10 further comprising means for calculating a group average of calls handled per time period of the call type of the classified call.

17. The apparatus for assigning calls as in claim 16 further comprising means for rejecting any bid from an agent of the plurality of agents where the agent's determined agent average exceeds a threshold value above the calculated group average.

18. An apparatus within a contact center for assigning a plurality of calls to one of a plurality of human agents, such apparatus comprising:

a call display processor adapted to provide an offer including a description of each of the plurality of calls, the description including context of the call to each of the plurality of human agents on a respective terminal of each of the human agents prior to assignment of the call to an agent of the plurality of human agents;

a respective call selection window for each of the plurality of calls displayed on each of the respective terminals, each of the call selection windows adapted to display the provided description of a call of the plurality of calls and to allow available agents of the plurality of agents to bid on the call;

a classification processor adapted to classify each of the plurality of calls as to call type and to determine an agent average number of calls handled per time period for each call type for each agent of the plurality of agents; and a call assignment processor of the contact center adapted to receive the bids and to assign the call to an agent of the plurality of human agents with a highest relative received bid.

19. The apparatus for assigning calls as in claim 18 wherein the description includes both call associated information and a contextual indication of the call.

20. The apparatus for assigning calls as in claim 19 further comprising an averaging agent processor adapted to calculate an agent group average of calls handled by the group for each call type, and wherein the assignment processor rejects any bids from an agent for the remainder of the a period if calls of a particular type served by the agent during the period exceeds a threshold amount above the calculated group average for the particular type.

21. The apparatus for assigning calls as in claim 18 wherein bids on the calls further comprise a numerical value between two non-zero limits.

22. A method of assigning a plurality of calls within a contact center to a plurality of agents, such method comprising the steps of:

providing a an offer within a respective call selection window for each of the plurality of calls the offer including a description with context information regarding a context of the call to each of the plurality of agents where each of the plurality of calls is classified as to type;

displaying the provided offers to the plurality of agents on respective terminals of the agents prior to assignment of the calls to the plurality of agents;

determining an agent average number of calls per time period for each call type for each agent of the plurality of agents;

receiving at least one bid within the contact center to handle a call of the plurality of calls from at least some of the plurality of agents available to converse with callers; and assigning the call within the contact center to an agent of the plurality of agents with a highest relative value of the received bids.

23. A method of assigning a plurality of calls within a contact center to a plurality of human agents, such method comprising the steps of:

providing an offer within a respective call selection window for each of the plurality of calls, the offer including a description of the call including call associated information and information indicating a context of the call;

displaying the provided offers to a portion of the plurality of human agents available to converse with a caller on a respective terminal of the portion, prior to assignment of the call to an agent of the plurality of human agents and classifying the call as to type;

receiving within the contact center a bid to handle the call from each of the portion of the plurality of human agents;

determining an agent average number of calls handled per time period for each call type for each agent of the portion of the plurality of agents;

the contact center comparing a value of each of the received bids; and the contact center assigning the call to an agent of the plurality of human agents with a highest relative value of the compared bids.

* * * * *